United States Patent [19]
Darnell

[11] Patent Number: 5,414,982
[45] Date of Patent: May 16, 1995

[54] FOLDABLE RAKE IMPLEMENT

[75] Inventor: Clete Darnell, Paducah, Ky.

[73] Assignee: Pick-up Rake Corporation, Paducah, Ky.

[21] Appl. No.: 974,291

[22] Filed: Nov. 10, 1992

[51] Int. Cl.⁶ .............................................. A01D 7/04
[52] U.S. Cl. .................... 56/400.19; 15/119.2; 294/19.1
[58] Field of Search ............ 56/400.4, 400.17, 400.18, 56/400.19, 400.2; 15/119.2, 244.1; 294/19.1

[56] References Cited

U.S. PATENT DOCUMENTS

| | | | |
|---|---|---|---|
| 678,519 | 7/1901 | Robinson | 56/400.19 X |
| 2,790,296 | 4/1957 | Bernstein | 56/400.19 X |
| 4,928,341 | 5/1990 | Pacione | 15/119.2 X |

Primary Examiner—David J. Bagnell
Attorney, Agent, or Firm—Gilliam & Stockwell

[57] ABSTRACT

A foldable rake implement (commonly referred to as a garden or lawn rake) suitable for smoothing the ground or gathering debris, such as leaves and grass clippings from the ground. The rake includes an elongated, preferably cylindrical, rod handle having a proximal end to be grasped by the user and a distal end. An articulated frame structure is attached to the rod handle proximate the distal end. The articulated frame has axes of articulation defining folding axes parallel to the rake rod handle about which the articulated frame articulates or moves between an unfolded position whereat the opposite sides of the articulated frame symmetrically project outwardly to opposite lateral sides of the rod handle and a folded position whereat the opposite sides of the articulated frame are moved toward each other and into generally mutual overlaying relationship. A plurality of spaced-apart tines are mounted to the articulated frame. An articulating device is associated with the rod handle and the articulated frame for selectively moving the articulated frame about the axes of articulation between the folded and unfolded positions.

17 Claims, 6 Drawing Sheets

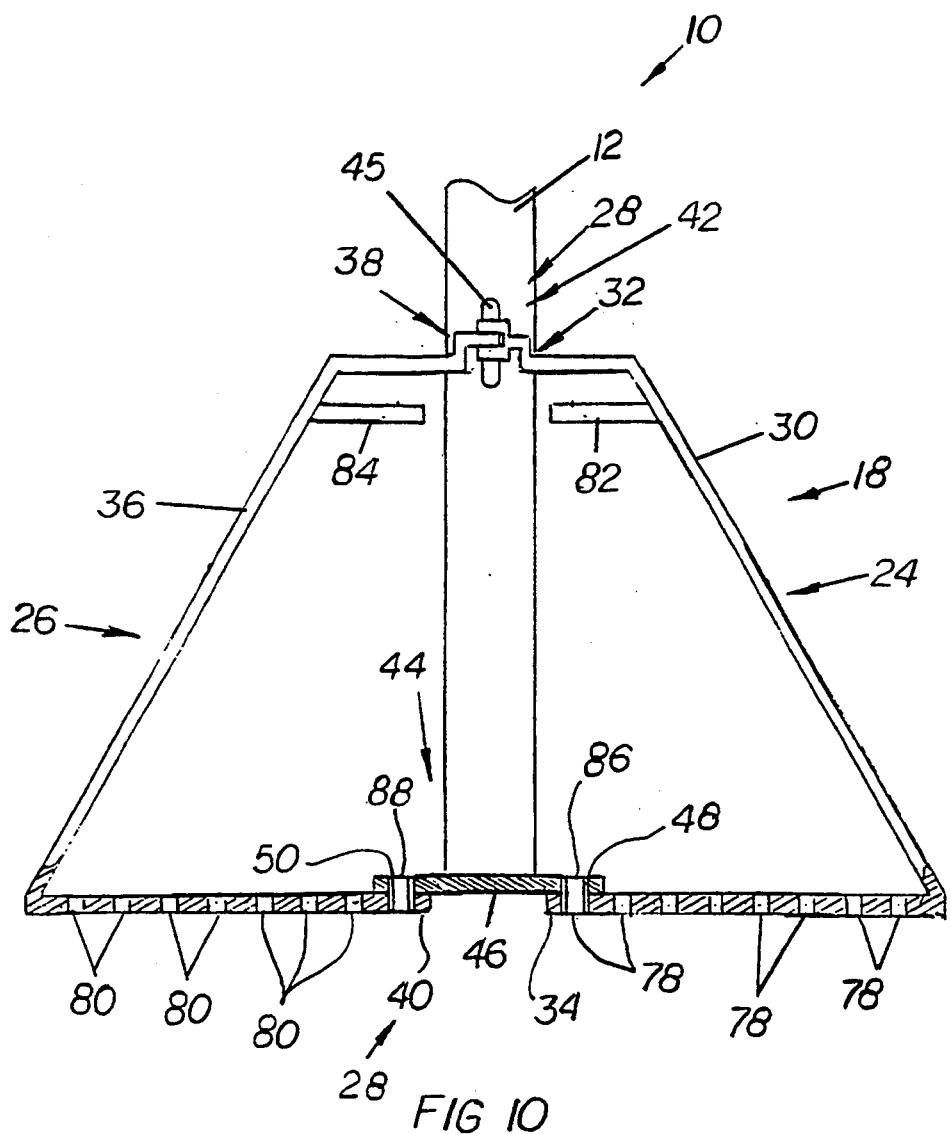
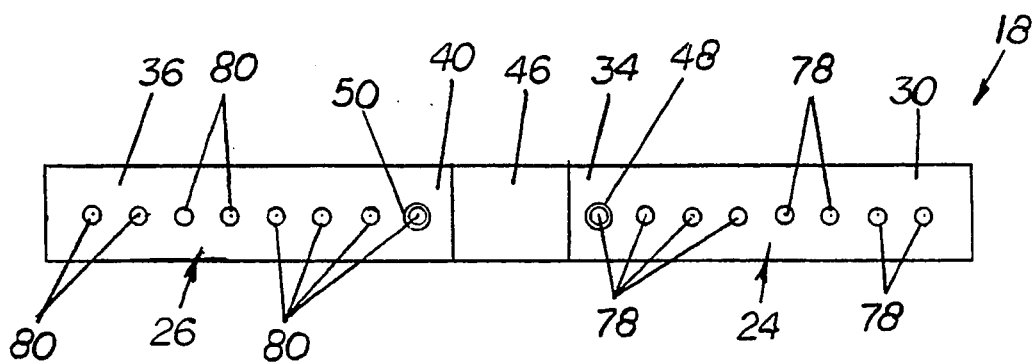

FOLDABLE RAKE IMPLEMENT

BACKGROUND OF THE INVENTION

The present invention relates to rake implements, and more particularly to a rake implement having an articulated frame structure to which the rake tines are mounted.

Rake implements known to me have tines mounted to rigid frame structures which hold the tines in a fixed row at the distal end of the rake handle. These known rakes are used to gather debris into groups or piles on the ground, but are not well-suited for lifting the gathered debris from the ground for disposal or easily moving the gathered material.

A typical method used with a conventional rake to lift gathered debris from the ground by a person working with the rake is to use one hand to hold the gathered debris against the fixed row of tines and then lift the rake with the other hand grasping the rake handle.

SUMMARY OF THE INVENTION

The present invention recognizes the drawbacks of the rake implements heretofore known to me and provides an articulated frame structure to which the rake tines are mounted so that the articulated frame structure can be moved between an unfolded position wherein the tines are held in a spaced-apart row for readily gathering the debris on the ground, and a folded position wherein the tines are moved to at least partially enclose or encircle the gathered debris so that the gathered debris is caged by the tines and then can be easily lifted from the ground without aid by the person using the rake.

More particularly, the present invention provides a foldable rake implement comprising an elongated rod handle having a proximal and a distal end, an articulated frame structure attached to the elongated handle at the distal end of the rod handle for articulated movement between folded and unfolded positions about the axes of articulation or folding axes parallel to the longitudinal axis of the rod handle, a plurality of projecting tines mounted to the articulated frame for motion therewith as the articulated frame is folded and unfolded, and articulating means associated with rod handle and the articulated frame for selectively moving the articulated frame about the folding axis between folded and unfolded positions.

BRIEF DESCRIPTION OF THE DRAWINGS

A better understanding of the present invention will be had upon reference to the following description in conjunction with the accompanying drawings, wherein like numerals refer to like parts throughout the several views and in which:

FIG. 9 is an end view as seen in the direction of arrows 9—9 in FIG. 8; and,

FIG. 10 is an enlarged front view of the articulated frame structure, partially in cross-section.

DETAILED DESCRIPTION OF THE PREFERRED EMBODIMENTS

Figure 1:
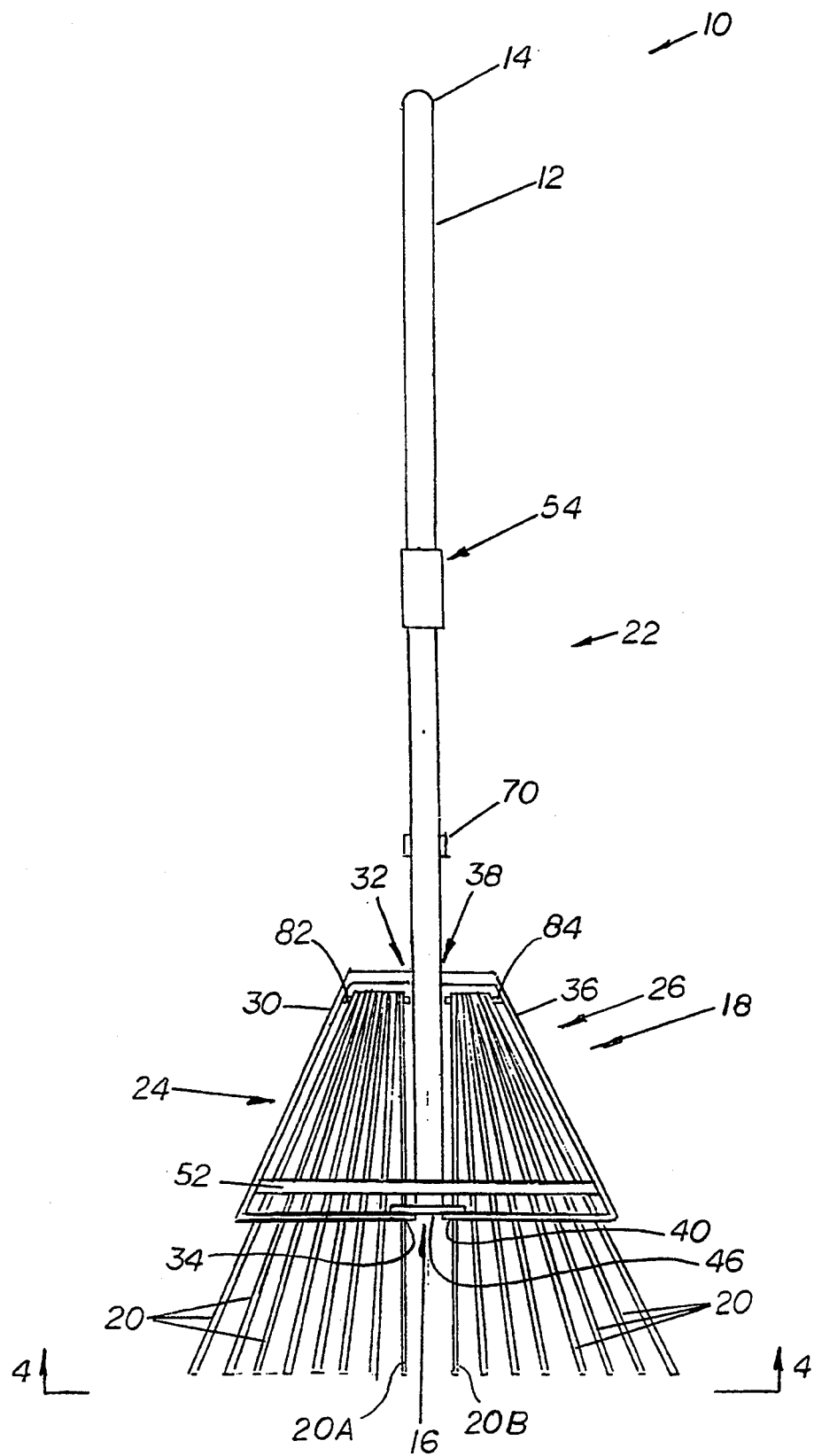
FIG. 1 is a front side view of a foldable rake implement of the present invention in the unfolded position.
Figure 2:
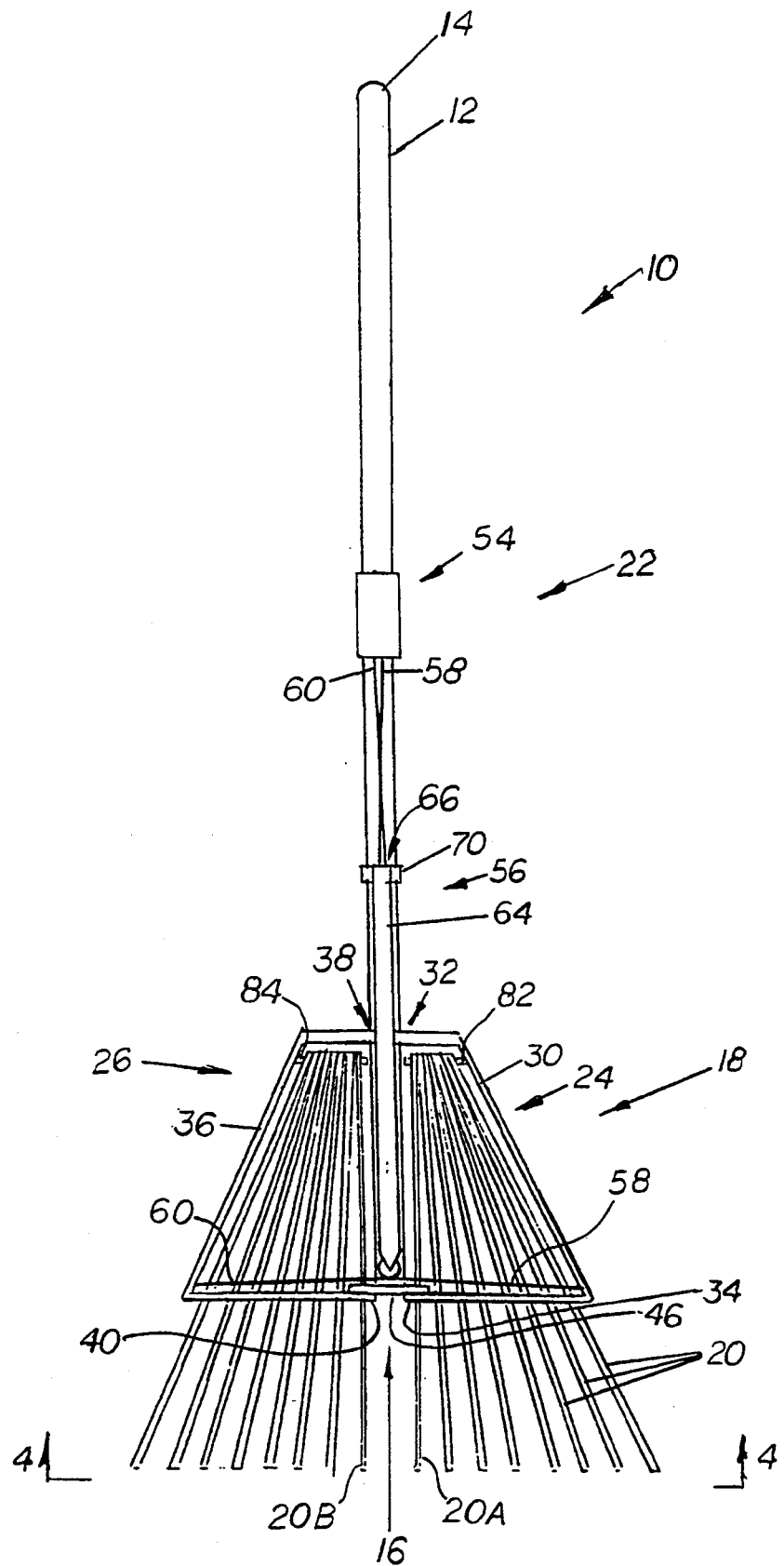
FIG. 2 is a back side view of the foldable rake implement of FIG. 1.
Figure 3:
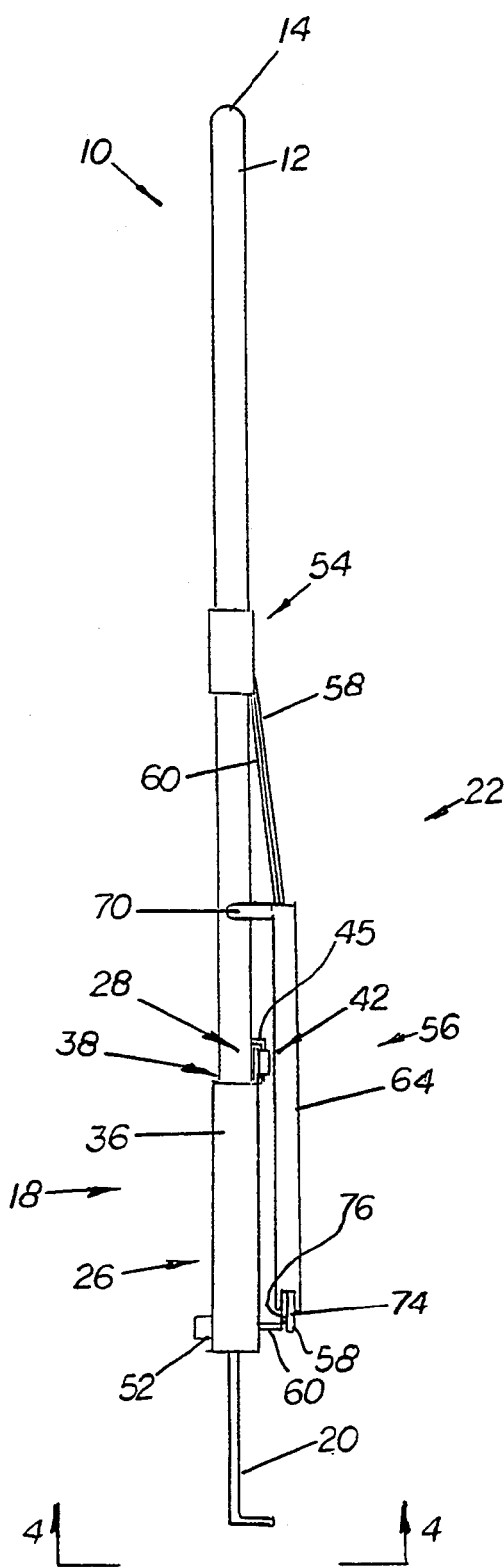
FIG. 3 is a left side view of the foldable rake implement, the right side view being the mirror image.
Figure 4:
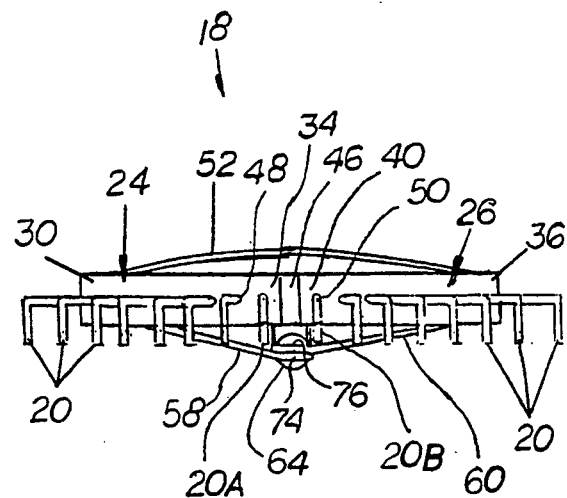
FIG. 4 is an end view of the foldable rake implement as seen in the direction of arrows 4—4 in FIGS. 1 and 2.
Figure 7:
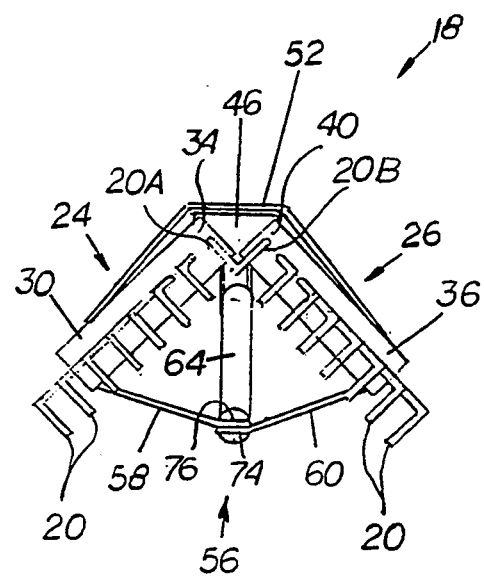
FIG. 7 is an end view of the foldable rake implement as seen in the direction of arrows 7—7 in FIG. 5.
Figure 6:
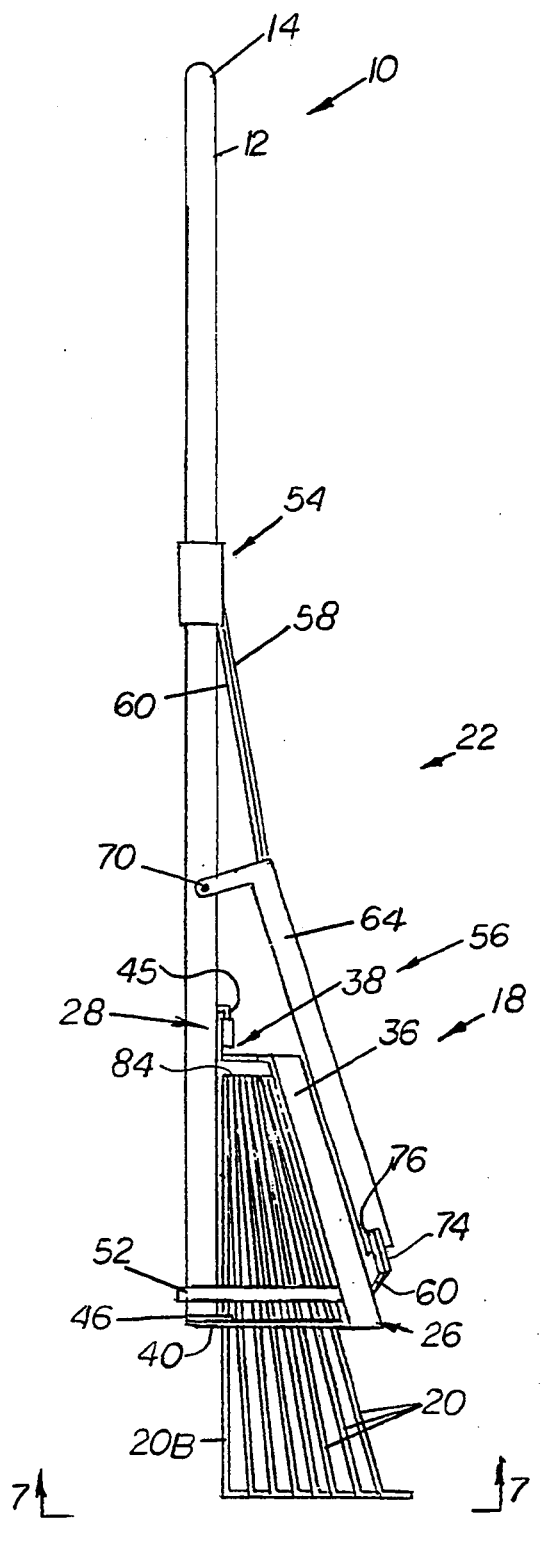
FIG. 6 is a left side view of the foldable rake implement, the right side view being the mirror image.
Figure 5:
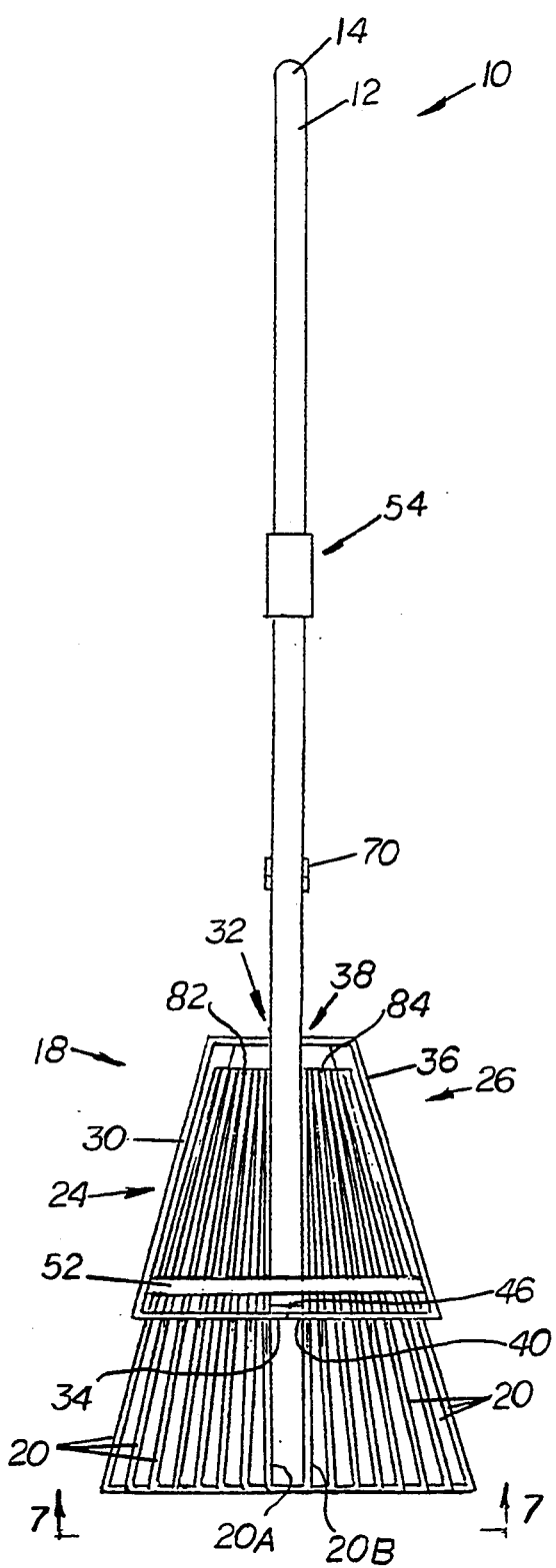
FIG. 5 is a front side view of the foldable rake implement of the present invention in the folded position.

With reference to FIGS. 1 through 7, there is shown a foldable rake implement, generally denoted as the numeral 10, of the present invention. The foldable rake implement includes an elongated rod handle 12 (preferably cylindrical in transverse cross-section) having a proximal end 14 and a distal end 16, an articulated frame structure 18 attached to the elongated rod handle 12 proximate the distal end 16, a plurality of spaced-apart tines 20 mounted to the articulated frame structure 18, and articulating means 22 associated with the rod handle 12 and the articulated frame structure for selectively moving the articulated frame structure about the axes of articulation or folding axes between an unfolded position whereat the tines 20 are held in a spaced-apart row across the distal end 16 and a folded position whereat the tines are moved with the articulated frame structure 18 to form a generally curved or arcuate array of tines 20. When the articulated frame structure 18 is in the unfolded position holding the tines 20 in a spaced-apart row, the rake implement is suitably configured for gathering debris on the ground. When the articulated frame structure 18 is in the folded position, holding the tines 20 in a curved array, the rake implement is suitably configured to cage and lift the gathered debris from the ground.

Figure 8:
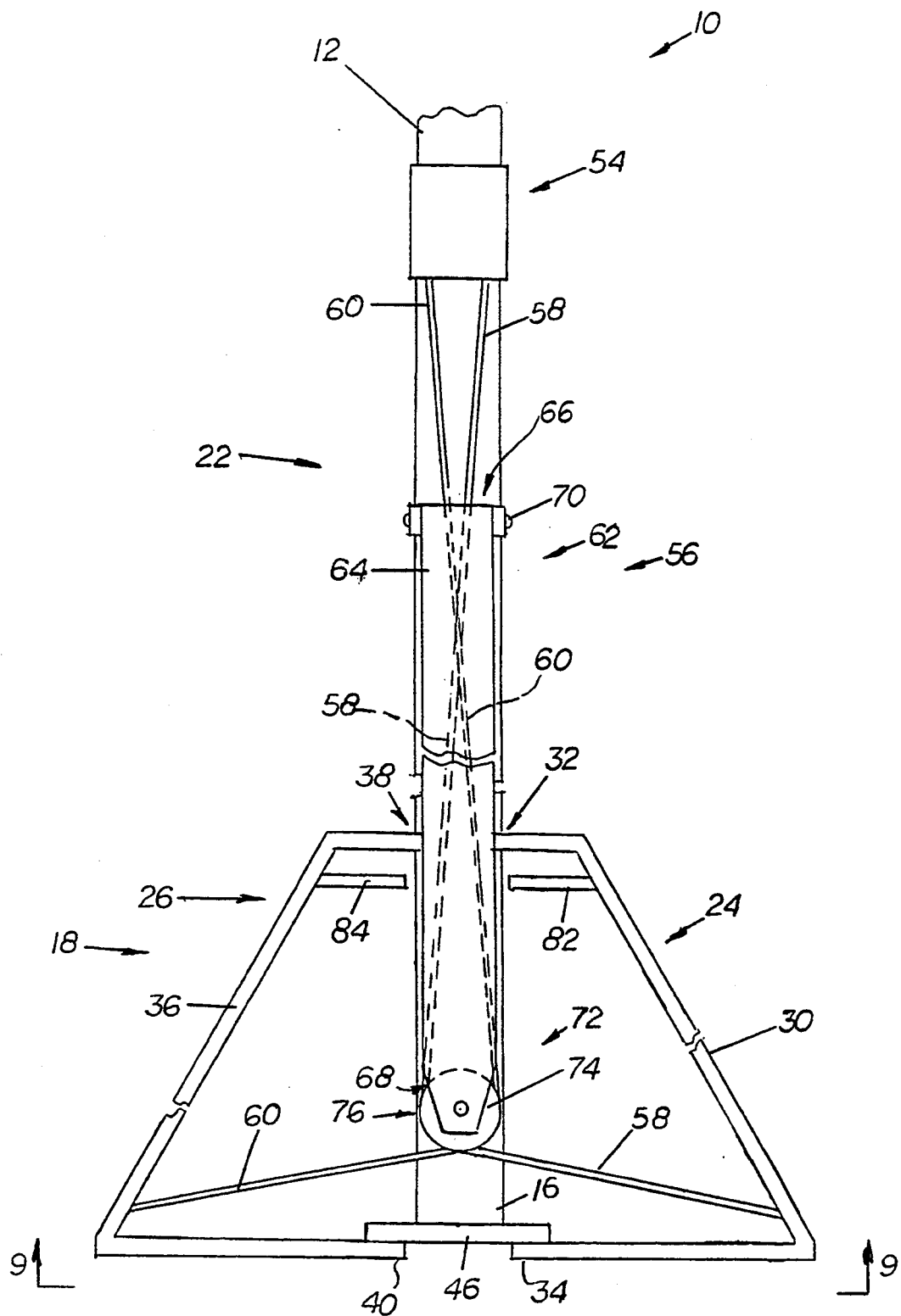
FIG. 8 is an enlarged backside view of the articulated frame structure of the present innovation in the unfolded position.

With particular reference to FIGS. 1 through 10, the articulated frame structure 18 comprises a first frame half 24 and a second frame half 26. The first and second frame halves are identically shaped and are disposed in mutual mirror image relationship to generally opposite lateral sides of the handle 12. The articulated frame structure 18 further includes hinge means, generally denoted as the numeral 28, defining the folding axes or axes of articulation which pivotally interconnects the first and second frame halves to the handle 12 for folding motion about the folding axes between the unfolded position (FIGS. 1–4) whereat the first and second frame halves symmetrically project outwardly generally from opposite lateral sides of the handle 12, and the folded position (FIGS. 5–7) whereat the first and second frame halves are mutually moved toward each other about the folding axes toward a mutually overlaying relationship. The first frame half 24 comprises a first curved frame member 30 having a first end 32 and a second end 34, and the second frame half 26 comprises a second curved frame member 36 having a first end 38 and a second end 40.

With reference to FIGS. 3, 4, 6 and 10, the hinge means 28 comprises a first hinge joint device 42 and a second hinge joint device 44. The first hinge joint device 42 is mounted to the rod handle 12 at a location spaced from the distal end 16 of the rod handle 12, and the second hinge joint device 44 is mounted to the rod handle 12 at the distal end 16. The hinge axes of the first and second hinges 42, 44 are parallel to the longitudinal axis of the rod handle 12. The first end 32 of the first curved frame member 30 is attached to the first hinge joint device 42 and the second end 34 of the first curved frame member 30 is attached to the second hinge joint device 44. The first end 38 of the second curved frame member 36 is attached to the first hinge joint device 42 and the second end 40 of the second curved frame member 36 is attached to the second hinge joint device 44. The hinge pin 45 of the first hinge joint device 42 is attached to the rake handle 12 in alignment with the longitudinal axis of the handle 12. The second hinge joint device 44 comprises a stationary mount plate 46 attached to the distal end 16 of the rod handle 12 with a first pivot joint 48 interconnecting the second end 34 of the first curved frame member 30 to the stationary mount plate 46 and a second pivot joint 50 interconnecting the second end 40 of the second curved frame member 36 to the stationary mount plate 46. The first pivot joint 48 and second pivot joint 50 are located generally to opposite lateral sides of the handle 12, i.e., they are diametrically located relative to the distal end 16 of the handle 12.

With reference to FIGS. 1, 3, 4, 6 and 7, the articulated frame structure 18 further comprises biasing means 52 interacting with the first frame half 24 and the second frame half 26 for biasing the first and second frame halves about the hinge means 28 toward the unfolded position. As shown, the biasing means 52 includes a leaf spring connected between its ends to the stationary mount plate 46, attached at one of its ends to the first frame half 24, and attached at the other of its ends to the second frame half 26. It is contemplated that the biasing means 52 could also be formed as a coil spring.

Now with reference to FIGS. 2, 3, 4, 6, 7 and 8, the articulating means 22 comprises an actuator device 54 and activating means 56. The actuator device 54 is mounted to the rake handle 12 between the articulated frame structure 18 and the proximal end 14 of the rake handle 12 and is movable between a deactuated position and an actuated position. The actuator device 54 is shown as a sleeve coaxially receiving the rake handle for sliding movement back and forth along the longitudinal axis of the handle between the deactuated and actuated positions. The activating means 56 interconnects the actuator device 54 and the articulated frame structure 18 for causing folding movement of articulated frame structure about the folding or articulating axes when the actuator device 54 is moved from the deactuated position to the actuated position. The activating means 56 also provides for the unfolding movement of the articulated frame structure about the folding or articulating axes, under the influence of the biasing force generated by the biasing means 52, when the actuator device 54 is moved from the actuated position to the deactuated position. The activating means 56 comprises a first link 58 interconnecting the actuator device 54 and the first frame half 24, and a second link 60 interconnecting the actuator device 54 and the second frame half 26. Therefore, when the actuator device 54 is moved to the actuated position, the first link 58 moves the first frame half 24 toward the folded position and, simultaneously, the second link 60 moves the second frame half 26 toward the folded position. The first link 58 is a first cable connected at one end to the actuator device 54 and connected at the other end to the first frame half 24. The second link 60 is a second cable connected at one end to the actuator device 54 and connected at the other end to the second frame half 26.

The activating means 56 further includes cable guide means 62 mounted to the handle 12 between the actuator device 54 and the articulated frame structure 18 for guiding the first cable link 58 from the actuator device 54 to the first frame half 24 and for guiding the second cable link 60 from the actuator device 54 to the second frame half 26. The cable guide means 62 comprises a tube member 64 having an open top end 66 and an open bottom end 68. The tube member 64 is located along the handle 12 with the open top end 66 adjacent the actuator device 54 and the open bottom end 68 adjacent the distal end 16 of the handle 12. The tube member 64 is pivotally interconnected to the rake handle 12 proximate the open top end 66 of the tube member 64 by a pivot 70. The pivot 70 allows the tube member 64 to move about the pivot 70 between a first position (see FIGS. 3 and 4) generally overlaying the rake handle 12 when the first and second frame halves are in the unfolded positions and a second position (see FIGS. 6 and 7) at an angle to the rake handle 12 when the first and second frame halves are moved to the folded positions. The first cable link 58 extends from the actuator device 54 through the tube member 64 to the first frame half 24 and the second cable link 60 extends from the actuator device 54 through the tube member 64 to the second frame half 26. Further, cable-engaging means 72 is mounted to the tube member 64 at the open bottom end 68. The cable-engaging means 72 engages the first and second cable links to train the first cable link 58 from the open bottom end 68 of the tube member 64 to the first frame half 24 and to train the second cable link 60 from the open bottom end 68 of the tube member 64 to the second frame half 26. Preferably, the cable-engaging means 72 consists of a first pulley 74 about which the first cable link 58 is partially wound and a second pulley 76 about which the cable link 60 is partially wound.

As shown best in FIGS. 1 through 7, 9 and 10, the tines 20 are mounted to the articulated frame structure 18 for movement therewith as the articulated frame structure is moved about the folding or articulating axes between folded and unfolded position. Toward this objective, a number of tines 20 are structurally associated with the first frame half 24 and an equal number of tines 20 are structurally associated with the second frame half 26. A portion of the length of the first curved frame member 30 of the first frame half 24 adjacent the second end 34 is formed with a row of spaced-apart first tine-receiving apertures 78 and a portion of the length of the second curved frame member 36 of the second frame half 26 adjacent the second end 40 is formed with a row of spaced-apart second tine-receiving apertures 80. A first tine mounting bracket 82 is attached to the first curved frame member 30 of the first frame half 24 proximate the first end 32 of the first curved frame member 30, and a second tine mounting bracket 84 is attached to the second curved frame member 36 of the second frame half 26 proximate the first end 38 of the second curved frame member 36. Each tine 20 structurally associated with the first frame half 24 is attached at its proximal end to the first tine mounting bracket 82 and extends from the first tine mounting bracket 82 through a different one of the tine-receiving apertures 78, such that the distal ends of the tines 20 project outwardly of the first frame half 24. Each tine 20 structurally associated with the second frame half 26 is attached at its proximal end to the second tine mounting bracket 84 and extends from the second tine mounting bracket 84 through a different one of the tine-receiving apertures 80 such that the distal ends of the tines 20 project outwardly of the first frame half 26. Preferably, the innermost two tines 20A and 20B adjacent the opposite lateral sides of the rake handle 12 are stationary and do not move with the first and second frame halves 24, 26. Toward this objective, the stationary mounting plate 46 of the second hinge device 44 is formed with a first tine-receiving aperture 86 adjacent one lateral side of the rake handle 12 in coaxial alignment with the innermost one of the first tine receiving-apertures 78 and a second tine-receiving aperture 88 adjacent the opposite lateral side of the rake handle 12 in coaxial alignment with the innermost one of the second tine receiving aperture 80. Preferably, the first tine-receiving aperture 86 is concentrically formed through the first pivot joint 48 and the second tine-receiving aperture 88 is concentrically formed through the second pivot joint 50. The innermost one of the tines 20A associated with the first frame half 24 is attached at its proximal end to the first tine mounting bracket 82 and extends from the first tine mounting bracket 82 through the first tine-receiving aperture 86 in the mounting plate 46 and coaxially aligned first tine receiving aperture 78 such that the distal end thereof projects outwardly from the first frame structure 24. The innermost one of the tines 20B associated with the second frame half 26 is attached at its proximal end to the second tine-mounting bracket 84 and extends through the second tine-receiving aperture 88 in the mounting plate 46 and coaxially aligned second tine receiving aperture 80 such that the distal end thereof projects outwardly from the second frame structure 26.

In operation or use of the folding rake implement 10, with the actuator device 54 in the deactuated position, the first and second frame halves 24 and 26 are in the unfolded position symmetrically projecting outwardly from opposite lateral sides of the handle 12, thereby holding the tines 20 in a row across the distal end 16 of the handle 12 such that the tines 20 are in a suitable configuration for gathering debris on the ground. When the debris has been gathered, the actuator device 54 is moved to the actuated position by pulling the actuator device sleeve along the handle 12 toward the proximal end 14 of the rake handle which then pulls the first and second link cables 58, 60 in a direction away from the articulated frame structure 18. The moving link cables 58, 60 pull the first and second frame halves 24, 26 toward each other causing them to pivot or fold toward each other about the folding axes. Also, as the link cables 58, 60 are pulled by the actuator device 54, the tube member 64 of the cable guide means 62 is caused to rotate about the pivot 70 from the first position overlaying the rake handle 12 to the second position at an angle to the rake handle 12 to guide the moving first and second link cables 58, 60 and maintain a tensioning force on the link cables 58, 60. The gathered debris is thereby at least partially enclosed or captured by the tines 20, with the first and second frame halves 24 and 26 caging the gathered debris so that it can be readily lifted from the ground and deposited in, for example, a container for disposal. In order to release the gathered material from the articulated frame structure 18, the actuator device 54 is moved back to the deactuated position by pushing the actuator device sleeve along the handle 12 away from the proximal end 14 of the rake handle 12 which then releases the tension on the first and second link cables 58, 60. As the tension on the first and second link cables 58, 60 is released, the biasing means 52 pushes or forces the first and second frame halves 24, 26 to pivot or unfold away from each other about folding axes back to the unfolded position and pulling the link cables 58, 60 in a direction toward the articulated frame structure 18. Also, as the link cables 58, 60 are pulled by the unfolding first and second frame halves 24, 26 the tube member 64 of the cable guide means 62 is caused to rotate about the pivot 70 from the second position at an angle to the rake handle 12 to the first position overlaying the rake handle 12 to guide the moving first and second link cables 58, 60 and maintain a tensioning force on the link cables 58, 60 so that they remain taut. The gathered debris is thereby released from the articulated frame structure 18.

The foregoing detailed description is given primarily for clearness of understanding and no unnecessary limitations are to be understood therefrom for modifications will become obvious to those skilled in the art upon reading this disclosure and may be made without departing from the scope of the inventions or scope of the appended claims.

I claim:

1. A foldable rake implement comprising:
   a. an elongated handle having a proximal end and a distal end;
   b. an articulated frame structure attached to the elongated handle proximal the distal end thereof for articulated movement between folded and unfolded positions, said frame structure having a solitary axis of articulation at a proximal end thereof and multiple axes of articulation at a distal end thereof;
   c. a plurality of projecting tines mounted to the articulated frame structure for motion therewith as the articulated frame structure is folded and unfolded; and,
   d. articulating means associated with the handle and the articulated frame structure for selectively folding and unfolding the articulated frame structure about the axes of articulation between folded and unfolded positions.

2. The folding rake implement of claim 1, further comprising biasing means associated with the articulated frame structure for biasing the articulated frame structure toward the unfolded position from the folded position.

3. The folding rake implement of claim 2, wherein the articulated frame structure comprises:
   a. first and second identically sized and shaped frame halves disposed in mirror image mutual relationship to the handle; and
   b. hinge means defining the axes of articulation of the articulated frame structure, each of the frame halves being pivotally interconnected with the hinge means for folding motion about the axes of articulation between the unfolded position whereat the frame halves symmetrically project outwardly generally opposite lateral sides of the handle and the folded position whereat the frame halves are mutually moved toward each other about the axes of articulation toward a mutually overlying relationship.

4. The folding rake implement of claim 3, wherein the hinge means comprises:
   a. a first hinge device mounted to the handle at a location spaced from the distal end of the handle;
   b. a second hinge device mounted to the handle at the distal end of the handle, and c. the hinge axis of the first and second hinges being parallel to the longitudinal axis of the handle.

5. The folding rake implement of claim 4, wherein:

a. the first frame half comprises a first curved frame member having first and second ends, the first end being attached to the first hinge device and the second end being attached to the second hinge device; and, b. the second frame half comprises a second curved frame member having first and second ends, the first end being attached to the first hinge device and the second end being attached to the second hinge device.

6. The folding rake implement of claim 5, wherein the second hinge device comprises:

a. a stationary mount attached to the distal end of the handle;

b. a first pivot joint interconnecting the second end of the first curved frame member to stationary mount; and, c. a second pivot joint interconnecting the second end of the second curved frame member to the stationary mount.

7. The folding rake implement of claim 6, wherein the first and second pivot joints are located to generally opposite lateral sides of the handle.

8. The folding rake implement of claim 2, wherein the biasing means comprises a spring interconnecting the first and second frame halves.

9. The folding rake implement of claim 1, wherein the articulating means comprises:

a. an actuator device mounted to the rake handle between the articulated frame structure and the proximal end of the handle movable between a deactuated position and an actuated position; and, b. activating means interconnecting the actuator device and the articulated frame structure for moving the articulated frame structure about the axes of articulation to the folded position when the activator device is moved from the deactuated to the actuated position and providing for the movement of the articulated frame about the axes of articulation to the unfolded position when the actuator device is moved from the actuated to the deactuated position.

10. The folding rake implement of claim 9, wherein the articulated frame structure comprises:

a. first and second identically shaped and configured frame halves disposed in mirror image mutual relationship to the handle;

b. hinge means defining the axes of articulation of the frame structure, each of the frame halves being pivotally interconnected with the hinge means for folding motion about the axes of articulation between the unfolded position whereat the frame halves symmetrically project outwardly generally opposite lateral sides of the handle and the folded position whereat the frame halves are mutually moved toward each other about the axes of articulation toward a mutually overlying relationship; and c. the activating means interconnects the actuator device to each of the first and second frame halves.

11. The folding rake implement of claim 10, wherein the activating means comprises:

a. a first link interconnecting the actuator device and the first frame half; and b. a second link interconnecting the actuator device and the second frame half; whereby, c. when the actuator device is moved to the actuated position, the first link moves the first frame half toward the folded position and simultaneously the second link moves the second frame half toward the folded position.

12. The folding rake implement of claim 11, wherein:

a. the first link comprises a first cable connected at one end to the actuator device and connected at the other end to the first frame half; and, b. the second link comprises a second cable connected at one end to the actuator device and connected at the other end to the second frame half.

13. The folding rake implement of claim 12, wherein the activating means further comprises cable guide means mounted to the handle between the actuator device and the articulated frame structure for guiding the first cable from the actuator device to the first frame half and for guiding the second cable from the actuator device to the second frame half.

14. The folding rake implement of claim 13, wherein the cable guide means comprises:

a. a tube member having an open top end and an open bottom end, the tube member being located along the handle with the open top end adjacent the actuator device and the open bottom end adjacent the distal end of the handle;

b. a pivot interconnecting the tube member proximate the open top end to the handle for allowing the tube member to pivot about the pivot between a first position generally overlaying the rake handle when the first and second frame halves are in the unfolded position and a second position at an angle to the rake handle when the first and second frame halves are moved to the folded position; and, c. wherein the first cable extends from the actuator device through the tube member to the first frame half and the second cable extends from the actuator device through the tube member to the second frame half.

15. The folding rake implement of claim 14, wherein the cable guide means further comprises cable engaging means mounted to the tube member proximate the open bottom end and engaging the first and second cables to train the first cable from the open bottom end of the tube member to the first frame half and to train the second cable from the open bottom end of the tube member to the second frame half.

16. The folding rake implement of claim 15, wherein the cable-engaging means comprises:

a. a first pulley about which the first cable is partially wound; and, b. a second pulley about which the second cable is partially wound.

17. The folding rake implement of claim 9, wherein the actuator device comprises a sleeve coaxially receiving the rake handle for sliding movement back and forth along the longitudinal axis of the handle between the deactuated position and actuated position.

* * * * *